May 18, 1965  R. R. B. JIERREE  3,183,608
MOLECULAR MODEL
Filed Aug. 10, 1962  2 Sheets-Sheet 1

INVENTOR
RUSSELL R. B. JIERREE
BY
ATTORNEY

May 18, 1965  R. R. B. JIERREE  3,183,608
MOLECULAR MODEL

Filed Aug. 10, 1962  2 Sheets-Sheet 2

INVENTOR
RUSSELL R. B. JIERREE
BY
ATTORNEY

United States Patent Office 3,183,608
Patented May 18, 1965

3,183,608
MOLECULAR MODEL
Russell R. B. Jierree, 3723 27th Ave. S., Minneapolis,
Minn.; Lillian E. Jierree, special administratrix of said
Russell R. B. Jierree, deceased
Filed Aug. 10, 1962, Ser. No. 216,124
6 Claims. (Cl. 35—18)

The present invention relates generally to an improved atomic or molecular model, and more particularly to such a model which consists of a plurality of concentric spherical elements arranged to depict or represent an atomic nucleus and the various electron orbits or energy states which according to theory, surround the nucleus in uniform concentric fashion, a composite arrangement of such spheres representing an atom, and a group of such atoms being arranged to represent a molecule.

In the presentation of such matter for educational purposes, such as in the elementary chemical, physical, or other natural sciences, the usual information of atomic structure, theory of molecular structure is accomplished by the study of certain 2-dimensional descriptive matter, diagrams and the like which may be available in book form, blackboard or the like. The student is accordingly generally confronted with a vast array of information which is not normally readily amenable to physical illustration in 3-dimensional form and in accordance with the currently utilized elementary theories of atomic and molecular formation. While it is appreciated that these theories are a means of establishing, building and improving the capability of the science student, the present invention provides a means by which the student may construct, observe and study atomic and molecular structures in accordance with these theories, and accordingly he will be more readily able and capable of comprehending the current theories employed. In other words, the apparatus of the present invention simulates, illustrates and otherwise represents atomic and molecular structures in accordance with the presently accepted elementary theories, particularly those used in connection with the fundamental sciences, these theories becoming a tangible reality which can be demonstrated to the students in order to better equip them to advance in their scientific comprehension. In accordance with the present invention, a plurality of concentric spherical units are employed to represent the various shell structures which comprise the classical structure of an atom, these spherical units being divided into hemispheres for facilitating assembly and disassembly of the overall structure. In addition, means are provided for retaining units which may be secured to the individual shell structures for physically representing the theoretical positions and locations of electrons which comprise the particular atomic structure. In addition, the center or innermost sphere is adapted to contain a plurality of smaller spherical units which may be adapted to simulate, represent or otherwise depict protons or neutrons which are theoretically believed to reside in the nucleus of a given atomic unit. Various preselected colors may be utilized to differentiate the various shells, neutrons, protons and electrons which are utilized to simulate the overall structure or assembly.

Therefore, it is an object of the present invention to provide an improved simulated atomic or molecular structure which is arranged in the form of a group of concentric patterns or the like.

It is a further object of the present invention to provide an improved simulated atomic structure which includes a plurality of concentric patterns within a sphere or the like, each of these concentric patterns being provided with means for receiving a physical representation of electrons, protons or neutrons in accordance with presently accepted atomic theories.

It is yet a further object of the present invention to provide an improved assembly for simulating, representing or otherwise depicting normal structure wherein a group of atoms may be physically arranged or adapted to be held together to form a molecular structure in accordance with presently accepted elementary teaching theories, means being provided for retaining the individually simulated atoms in relatively spaced relationship, one to another.

It is yet a further object of the present invention to provide an improved model simulating atomic structure wherein the various electrons are adapted to be disposed in orbital relationship to the atomic nucleus.

Other and further objects of the present invention will become apparent to those skilled in the art upon a study of the following specification, appended claims and accompanying drawings, wherein:

Figure 9:
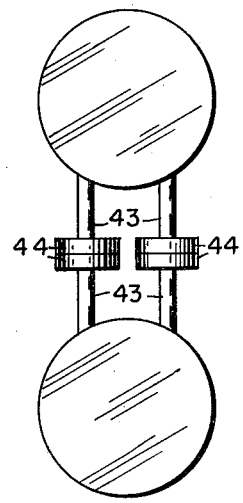
Figure 10:
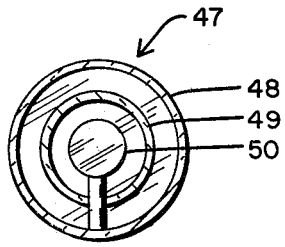

FIG. 9 is a plan view of an ionic bond existing between a pair of atoms, the bond being illustrated with a pair of adhering members for each bond, these members being removed from the surface of the shell by means of rod-like extensions; and, FIG. 10 is a cross-sectional view taken through the diameter of a model illustrating the effect of disintegration of an unstable element to a pair of more stable elements along with the dissipation of a certain quantity of energy.

Figures 1, 2, 3, 4, 5:
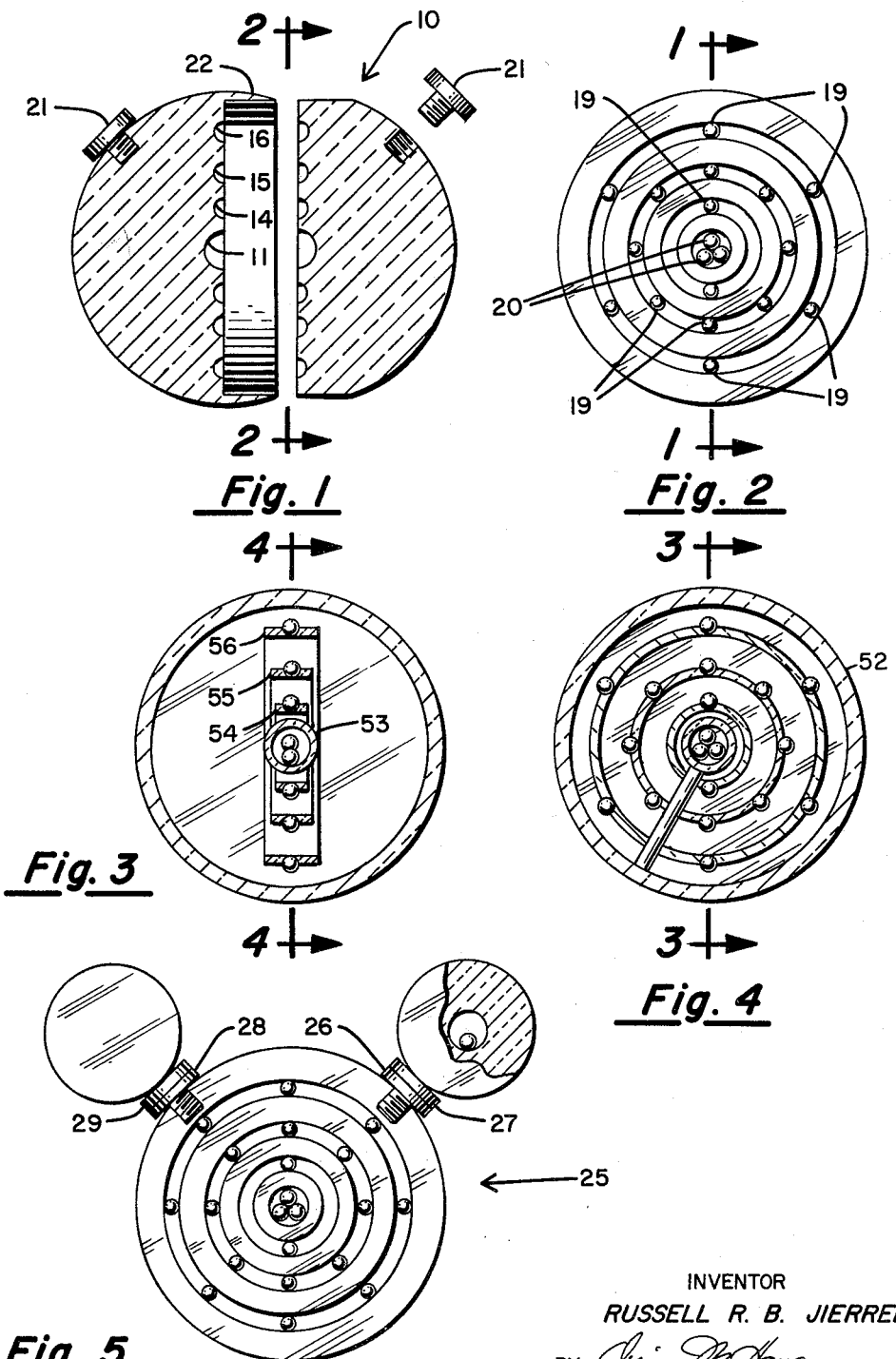
FIG. 1 is a cross-sectional view through the center of a spherical model prepared in accordance with a modification of the present invention and taken along the line and in the direction of the arrows 1—1 of FIG. 2.
FIG. 2 is a sectional view taken through the center of the model shown in FIG. 1 and taken along the line and in the direction of the arrows 2—2 of FIG. 1, the atomic arrangement being illustrated as that of the oxygen atom.
FIG. 3 is a sectional view taken through the center of a model prepared in accordance with another modification of the present invention and taken along the line and in the direction of the arrows 3—3 of FIG. 4.
FIG. 4 is a sectional view taken through the center of the spherical model of FIG. 3, the view being taken along the line and in the direction of the arrows 4—4 of FIG. 3, the proton and electron arrangement being that of a theoretical oxygen atom.
FIG. 5 is a plan view of a water molecule fabricated in accordance with a modification of the present invention.

In accordance with a preferred modification of the present invention, FIG. 1 illustrates a sectional view of an atomic structure 10 which includes a central nucleus 11, the atom being represented by a solid sphere and including a plurality of toroidal grooves representing the electron orbits which according to elementary theory are located in the outer shells of the atomic structure. The various electron orbital fields which are arranged, at least theoretically in concentric arrays around the nucleus are represented by the grooves 14, 15 and 16. Of course, for elements of higher atomic number, there would be additional shells, the outer shell commencing to fill, particularly when the electron distribution theory as set forth in the models of the present invention is followed. In order to illustrate the position as well as the number of electrons in the individual shells, a group of smaller spheres or beads may be utilized such as the electron designating beads 19—19. The number of these beads will, of course, depend upon the atomic number of the element represented. In order to illustrate the protons in the nucleus, a different color of bead or sphere is utilized, such as the beads 20—20. For higher atomic numbers, certain of these may be made to represent a greater number of protons such as 5, 10 or more. The valence of the particular atomic unit may be represented by a different colored valence plug or unit 21 which may be, for example, a plug which is adapted to be screwed into the outer surface of the sphere. For certain types of atomic or molecular bonding, the valence plug may include a magnetic member or the like. In addition, for clarity and for purposes of added distinctions, a negative valence may be represented by one color, for example green, while a positive valence for a given ion or atom may be represented by a red valence plug. In order to retain the two hemispheres in proper relative position, one to another, a flange portion such as the flange 22 may be included along the outer surface of one of the hemispheres. Of course, other suitable retaining techniques may be utilized.

For the conventional atoms, reference is made to Table I below for a designation of the electron distribution in the various individual shells in the atomic structure. Reference is made to the spherical beads 19—19, these electrons being adapted to be received in the various shells or orbital designations by means of an interference fit or, if desired, by mating threads.

Table I.—Electron distribution

| Element | Atomic Number | Number of electrons in the separate shells | | | | | | |
|---|---|---|---|---|---|---|---|---|
| | | K | L | M | N | O | P | Q |
| H | 1 | 1 | | | | | | |
| He | 2 | 2 | | | | | | |
| Li | 3 | 2 | 1 | | | | | |
| Be | 4 | 2 | 2 | | | | | |
| B | 5 | 2 | 3 | | | | | |
| * | * | * | * | | | | | |
| F | 9 | 2 | 7 | | | | | |
| Ne | 10 | 2 | 8 | | | | | |
| Na | 11 | 2 | 8 | 1 | | | | |
| Mg | 12 | 2 | 8 | 2 | | | | |
| Al | 13 | 2 | 8 | 3 | | | | |
| * | * | * | * | * | | | | |
| O | 16 | 2 | 8 | 6 | | | | |
| Cl | 17 | 2 | 8 | 7 | | | | |
| A | 18 | 2 | 8 | 8 | | | | |
| K | 19 | 2 | 8 | 8 | 1 | | | |
| Ca | 20 | 2 | 8 | 8 | 2 | | | |
| * | * | * | * | * | * | | | |
| Kr | 36 | 2 | 8 | 18 | 8 | | | |
| Rb | 37 | 2 | 8 | 18 | 8 | 1 | | |
| Sr | 38 | 2 | 8 | 18 | 8 | 2 | | |
| * | * | * | * | * | * | * | | |
| Xe | 54 | 2 | 8 | 18 | 18 | 8 | | |
| Cs | 55 | 2 | 8 | 18 | 18 | 8 | 1 | |
| Ba | 56 | 2 | 8 | 18 | 18 | 8 | 2 | |
| * | * | * | * | * | * | * | * | |
| Rn | 86 | 2 | 8 | 18 | 32 | 18 | 8 | |
| * | * | * | * | * | * | * | * | |
| Ra | 88 | 2 | 8 | 18 | 32 | 18 | 8 | 2 |

For the various distributions of electrons in the certain specific atoms, reference is made to Table I which discloses the appropriate number of electrons in the separate shells surrounding the nucleus. In the model, the shells K, L, M, N, O, P and Q are intended to be represented by the first, second, third, fourth, fifth, sixth and seventh concentric shells respectively. Each of the shells is provided with the appropriate number of electrons which would normally be expected to reside in the individual shells. Different spherical bodies are provided to illustrate the individual atoms of various atomic number.

Inasmuch as the inner shells are merely, for most purposes, illustrative of the basic atomic structure, the provision of means used to represent electrons therein is pertinent only to show the fundamental nature of the structure. The valence plugs in the outer shell structure are normally utilized to illustrate the valences, oxidation state, or the like of the individual atom. In addition, these valence plugs in the outer shell may be utilized to show the various manners by which the elements combine to form molecular structures.

Therefore, particular attention is directed to FIG. 5 which illustrates a water molecule generally designated 25. The central sphere is illustrative of the oxygen atom while the two outer spheres represent the hydrogen atoms. Valence plugs which include a magnetic substance therein 26, 27, 28 and 29 are provided, two for the oxygen atom and one each for the hydrogen atoms. The covalent nature of the molecule may be represented by including eight electrons in the outer shell of the oxygen atom and indicating a shared electron in the outer shell of the hydrogen atom. The shared electrons may be, for example, represented by a small sphere or bead of a color different from that of the other electrons. The physical bonding of the hydrogen to the oxygen may be satisfactorily represented by the magnetic plugs. When an ionic bond is being illustrated, similar magnetic valence plugs may be employed to illustrate the nature of the bond, however as indicated previously the negative ion may carry a valence plug of one color while the positive ion may carry a valence plug of another color.

Figure 6:
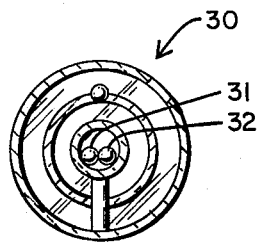
FIG. 6 is a sectional view of a deuterium atom showing a proton and a neutron situated in the nucleus thereof.
Figure 7:
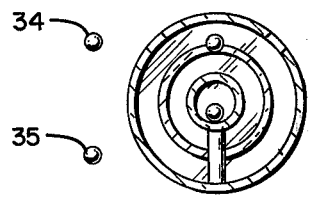
FIG. 7 is a view similar to FIG. 6 of a deuterium atom and illustrating the decay of the deuterium atom to a hydrogen atom, the energy dissipated being illustrated externally of the nascent hydrogen atom.

Referring now to FIG. 6, a radioactive element or an isotope of an ordinary atom may be represented by including neutrons in the nucleus. For example, the isotope deuterium of the element hydrogen is illustrated in the model generally designated 30, the nucleus including a pair of spheres 31 and 32, the sphere 32 representing the conventional proton, 31 being a neutron. With reference to FIG. 7, the disintegrated or decayed product of an unstable isotope is shown wherein the neutron has been removed from the nucleus leaving only the proton, the energy dissipated from the element during the decay process being by externally disposed spheres 34 and 35.

Figure 8:
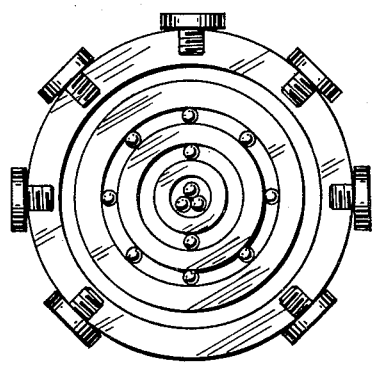
FIG. 8 is a view similar to FIG. 2, however illustrating a heptavalent chlorine atom showing the "M" shell void of electrons.

Attention is now directed to FIG. 8 wherein an atom is shown with a large number of valance plugs along the outer surface. The ion is heptavalent chlorine which includes, in ionic form, two electrons in the K shell, eight in the L shell and none in the M shell. This oxidation state results in the heptavalent ion and the giving up of electrons from the outer shell together with the modification of valence is readily shown in the ion as modified from the atomic form. Other valences as exemplified by other oxidation states of chlorine may be represented by a model having a different number of electrons in the M shell together with the corresponding change in the valence state.

It will be appreciated that the structure of these various atomic models may be modified by means of the addition to or the subtraction of certain protons or electrons or a combination thereof. With these modifications in mind, it should be reasonably possible to prepare, fabricate or otherwise design an elementary model of an atom which will represent any of a group of elements. In other words, given either building blocks or fundamental mechanisms, the student may add electrons, protons, and even neutrons to the structure and thereby fabricate models of certain of the elements. Furthermore, it is possible to either add electrons to or remove electrons from the structure in order to designate appropriate ions of the individual or particular elements. In this regard, a suitable valence plug or plugs corresponding to the change in oxidation state of the element would be provided in order to represent the ultimate valence state thereof.

FIG. 9 illustrates a pair of atoms held together by an ionic or other bond. Each of the atoms has a pair of dowels or rod-like elements secured to the surface thereof, each of these having a magnetic element at the outer or free end thereof. These magnetic elements representing the valence state are employed to hold the pair of spheres together in a typical ionic form or bond. The dowels are illustrated at 43—43 and the individual valence plugs are shown at 44—44. Preferably, dowels 43—43 are fabricated from flexible material in order to be accommodated in the surface of a spherical shell, and wherein the lengths would not be equal.

Attention is now directed to FIG. 10 wherein a model of an unstable isotope is illustrated, the overall structure being generally designated 47. The assembly contains the outer shell 48 along with an inner shell 49 and a central sphere 50. To illustrate a state of at least partial disintegration, the assembly may be disassembled and a pair of elements ultimately formed therefrom. The outer spherical shell will be provided with a separate nucleus and a separate group of electron orbital rings, and the inner shell 49 will then function as the outer shell of the stable product of the destruction of the unstable isotope. The shells 48 and 49 may be disassembled and reformed in accordance with the manner disclosed in the apparatus shown in FIGURES 1 and 2 to illustrate the elements formed upon disintegration of the original substance.

With particular attention directed to FIGS. 3 and 4, a modified form of model is illustrated, such as the model 52. In the interior of the shell 52 a plurality of circular hoops or the like are provided such as hoops 53, 54, 55 and 56. The central hoop 53 may be utilized to illustrate the nucleus of the structure while the remaining hoops may be utilized to illustrate the electron orbits. Valence plugs may, of course, be provided along the outer surface of the sphere.

While various specific modifications, illustrations, and the like have been shown, it will be appreciated that certain other modifications may be readily provided without departing from the spirit and scope of the present invention.

I claim:
1. Apparatus for illustrating models of atoms, molecules or the like, said apparatus including an outer spherical shell, concentric retaining means disposed within said shell for retaining representations of orbital electrons, means disposed substantially concentrically therewith for representing an atomic nucleus, and means arranged to be received along the periphery of said spherical shell for representing the valence state of the atom being represented.

2. The apparatus as set forth in claim 1 being particularly characterized in that said valence representing means are magnetic.

3. The apparatus as set forth in claim 1 being particularly characterized in that said concentrically arranged retaining means are toroidal grooves.

4. The apparatus as set forth in claim 1 being particularly characterized in that said concentrically arranged retaining means are circular hoops.

5. The apparatus for illustrating models of atoms, molecules or the like, said apparatus including an outer spherical shell, concentric retaining means disposed within said shell for releasably retaining representations of orbital electrons, means disposed substantially concentrically therewith for representing an atomic nucleus, and means arranged to be received along the periphery of said spherical shell for representing the valence state of the atom being represented.

6. The apparatus as set forth in claim 5 being particularly characterized in that said valence representing means are magnetic.

References Cited by the Examiner

UNITED STATES PATENTS

| | | | |
|---|---|---|---|
| 2,882,617 | 4/59 | Godfrey | 35—18.5 |
| 2,962,820 | 12/60 | Peterson | 35—18.5 |
| 3,080,662 | 3/63 | Brumlik | 35—18.5 |

FOREIGN PATENTS 1,214,106  11/59  France.

JEROME SCHNALL, *Primary Examiner.*

GEORGE A. NINAS, JR., *Examiner.*